United States Patent
Zhang et al.

(10) Patent No.: US 9,527,262 B2
(45) Date of Patent: Dec. 27, 2016

(54) LAYERED ARRANGEMENT, HOT-GAS PATH COMPONENT, AND PROCESS OF PRODUCING A LAYERED ARRANGEMENT

(71) Applicant: GENERAL ELECTRIC COMPANY, Schenectady, NY (US)

(72) Inventors: Xiuzhang James Zhang, Simpsonville, SC (US); Haiping Wang, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 607 days.

(21) Appl. No.: 13/630,708

(22) Filed: Sep. 28, 2012

(65) Prior Publication Data
US 2015/0251376 A1    Sep. 10, 2015

(51) Int. Cl.
*C04B 37/00* (2006.01)
*F04D 29/44* (2006.01)
(Continued)

(52) U.S. Cl.
CPC ............... *B32B 3/263* (2013.01); *B32B 3/12* (2013.01); *B32B 3/26* (2013.01); *B32B 3/30* (2013.01);
(Continued)

(58) Field of Classification Search
CPC ............... F23R 3/00; F02C 3/00; B32B 3/12; B32B 3/263; B32B 3/26; B32B 9/005; B32B 9/04; B32B 15/04; B32B 37/0084; B32B 37/12; B32B 2307/304; B32B 3307/306; B32B 2250/03; B32B 2262/106; B32B 37/144; B32B 37/146; B32B 37/16; F05D 2300/175; F05D 2300/20; F05D 2300/6033; F05D 2240/24;F05D 2240/15; F05D 2240/11; F05D 2240/12; F05D 2260/22141; F05D 2250/291; F05D 2260/20; F05D 2260/301; C04B 7/025
See application file for complete search history.

(56) References Cited

U.S. PATENT DOCUMENTS 2,977,265 A * 3/1961 Forsberg .................. B28B 1/265
156/197
3,635,587 A * 1/1972 Giesman .................. F01D 5/189
29/889.721
(Continued)

OTHER PUBLICATIONS

"Lockheed SR-71 Blackbird", pp. 5, SR-71, Online by Paul R. Kucher http://www.sr-71.org/blackbird/sr-71/ Copyright 1998-2010.
(Continued)

*Primary Examiner* — Alex Efta
(74) *Attorney, Agent, or Firm* — McNees Wallace & Nurick LLC

(57) ABSTRACT

A layered arrangement, a hot-gas path component, and a process of producing a layered arrangement are disclosed. The layered arrangement includes a substrate layer, a ceramic matrix composite layer, and a non-metal spacer between the substrate layer and the ceramic matrix composite layer configured to define one or more pockets. The hot-gas-path component includes a nickel-based superalloy layer, a ceramic matrix composite layer, and a ceramic spacer between the nickel-based superalloy layer and the ceramic matrix composite layer. The ceramic spacer is mechanically secured to one or both of the substrate layer and the ceramic matrix composite layer, and the ceramic spacer is bonded to the substrate layer or the ceramic matrix composite layer. The process includes securing a non-metal spacer between a substrate layer and a ceramic matrix composite layer of the layered arrangement.

18 Claims, 4 Drawing Sheets

(51) Int. Cl.
| | | |
|---|---|---|
| *F03D 1/04* | (2006.01) | |
| *B32B 3/26* | (2006.01) | |
| *B32B 3/12* | (2006.01) | |
| *F01D 5/18* | (2006.01) | |
| *F01D 11/24* | (2006.01) | |
| *C04B 37/02* | (2006.01) | |
| *B32B 9/00* | (2006.01) | |
| *B32B 9/04* | (2006.01) | |
| *B32B 3/30* | (2006.01) | |
| *B32B 15/04* | (2006.01) | |
| *B32B 37/00* | (2006.01) | |
| *F01D 9/02* | (2006.01) | |
| *B32B 37/12* | (2006.01) | |
| *B32B 37/14* | (2006.01) | |
| *B32B 37/16* | (2006.01) | |
| *C04B 37/04* | (2006.01) | |
| *C04B 35/117* | (2006.01) | |
| *C04B 35/48* | (2006.01) | |
| *C04B 35/185* | (2006.01) | |
| *C04B 35/01* | (2006.01) | |
| *C04B 35/515* | (2006.01) | |
| *C04B 35/584* | (2006.01) | |

(52) U.S. Cl.
CPC ............ *B32B 9/005* (2013.01); *B32B 9/04* (2013.01); *B32B 15/04* (2013.01); *B32B 37/0084* (2013.01); *B32B 37/144* (2013.01); *C04B 37/025* (2013.01); *F01D 5/187* (2013.01); *F01D 9/02* (2013.01); *F01D 11/24* (2013.01); *B32B 37/12* (2013.01); *B32B 37/146* (2013.01); *B32B 37/16* (2013.01); *B32B 2250/03* (2013.01); *B32B 2262/105* (2013.01); *B32B 2262/106* (2013.01); *B32B 2307/304* (2013.01); *B32B 2311/00* (2013.01); *B32B 2315/02* (2013.01); *B32B 2603/00* (2013.01); *B32B 2605/18* (2013.01); *C04B 35/01* (2013.01); *C04B 35/117* (2013.01); *C04B 35/185* (2013.01); *C04B 35/48* (2013.01); *C04B 35/5156* (2013.01); *C04B 35/584* (2013.01); *C04B 37/003* (2013.01); *C04B 37/04* (2013.01); *C04B 2237/068* (2013.01); *C04B 2237/34* (2013.01); *C04B 2237/341* (2013.01); *C04B 2237/343* (2013.01); *C04B 2237/36* (2013.01); *C04B 2237/363* (2013.01); *C04B 2237/365* (2013.01); *C04B 2237/368* (2013.01); *C04B 2237/38* (2013.01); *C04B 2237/403* (2013.01); *C04B 2237/405* (2013.01); *C04B 2237/406* (2013.01); *C04B 2237/597* (2013.01); *C04B 2237/704* (2013.01); *C04B 2237/706* (2013.01); *C04B 2237/72* (2013.01); *F05D 2240/11* (2013.01); *F05D 2240/12* (2013.01); *F05D 2240/126* (2013.01); *F05D 2240/15* (2013.01); *F05D 2240/24* (2013.01); *F05D 2240/303* (2013.01); *F05D 2240/81* (2013.01); *F05D 2250/232* (2013.01); *F05D 2250/241* (2013.01); *F05D 2250/28* (2013.01); *F05D 2250/291* (2013.01); *F05D 2260/20* (2013.01); *F05D 2260/204* (2013.01); *F05D 2260/22141* (2013.01); *F05D 2300/175* (2013.01); *F05D 2300/20* (2013.01); *F05D 2300/6033* (2013.01); *Y10T 428/24562* (2015.01); *Y10T 428/24612* (2015.01); *Y10T 428/24942* (2015.01); *Y10T 428/24967* (2015.01)

(56) References Cited

U.S. PATENT DOCUMENTS

| | | | | |
|---|---|---|---|---|
| 3,644,060 | A * | 2/1972 | Bryan | 416/97 R |
| 3,695,778 | A * | 10/1972 | Taylor | F01D 5/147 416/233 |
| 4,118,146 | A * | 10/1978 | Dierberger | F01D 5/182 415/115 |
| 4,594,761 | A * | 6/1986 | Murphy | B23P 15/04 29/418 |
| 5,328,331 | A * | 7/1994 | Bunker | F01D 5/187 415/115 |
| 5,331,816 | A * | 7/1994 | Able | F23R 3/007 60/752 |
| 5,626,462 | A * | 5/1997 | Jackson | C22C 32/00 416/229 A |
| 5,725,355 | A * | 3/1998 | Crall | F01D 5/147 416/229 A |
| 6,200,092 | B1 | 3/2001 | Koschier | |
| 6,514,046 | B1 * | 2/2003 | Morrison et al. | 416/229 A |
| 6,648,597 | B1 | 11/2003 | Widrig et al. | |
| 6,761,956 | B2 * | 7/2004 | Lee | C23C 28/321 416/241 B |
| 6,767,659 | B1 * | 7/2004 | Campbell | C04B 41/009 428/697 |
| 6,769,866 | B1 * | 8/2004 | Kannefass | F01D 5/147 415/115 |
| 6,942,203 | B2 | 9/2005 | Schroder et al. | |
| 7,044,709 | B2 | 5/2006 | Bruce et al. | |
| 7,117,983 | B2 | 10/2006 | Good et al. | |
| 7,500,828 | B2 * | 3/2009 | Landis | 416/97 R |
| 7,556,475 | B2 | 7/2009 | Roberts, III et al. | |
| 7,604,456 | B2 | 10/2009 | Schiavo, Jr. et al. | |
| 7,828,515 | B1 * | 11/2010 | Kimmel | 415/115 |
| 8,047,773 | B2 | 11/2011 | Bruce et al. | |
| 2006/0177582 | A1 * | 8/2006 | Chandra et al. | 427/250 |
| 2007/0098546 | A1 | 5/2007 | Cairo et al. | |
| 2007/0134408 | A1 * | 6/2007 | Skoog et al. | 427/142 |
| 2008/0253885 | A1 * | 10/2008 | Foose | F01D 5/147 415/208.2 |
| 2009/0257875 | A1 | 10/2009 | McCaffrey et al. | |
| 2009/0260364 | A1 * | 10/2009 | Keller et al. | 60/753 |
| 2010/0054932 | A1 | 3/2010 | Schiavo | |
| 2010/0068034 | A1 * | 3/2010 | Schiavo et al. | 415/115 |
| 2010/0166565 | A1 * | 7/2010 | Uskert et al. | 416/226 |
| 2010/0183435 | A1 | 7/2010 | Campbell et al. | |
| 2012/0124832 | A1 * | 5/2012 | Bunker et al. | 29/888 |
| 2013/0078104 | A1 * | 3/2013 | McKaveney | F01D 5/147 416/219 R |
| 2013/0108470 | A1 * | 5/2013 | Weisse | B23P 15/04 416/97 R |

OTHER PUBLICATIONS

"At What Speed Does Wind Chill Give Way to Frictional Heating" Metallurgy—Metals at the Molecular Scale—The Naked Scientist http://www.thenakedscientists.com/HTML/questions/qotw/question/3046/ May 28, 2011.

* cited by examiner

LAYERED ARRANGEMENT, HOT-GAS PATH COMPONENT, AND PROCESS OF PRODUCING A LAYERED ARRANGEMENT

FIELD OF THE INVENTION

The present invention is directed to manufactured components and processes of producing manufactured components. More specifically, the present invention is directed to layered arrangements and components having a ceramic matrix composite layer within layered arrangements.

BACKGROUND OF THE INVENTION

Ceramic matrix composite materials are known for having high temperature resistance. However, components using such ceramic matrix composites can have undesirably low stress-resistance. In contrast, metal components can have high stress-resistance. However, metal components subjected to high temperatures, such as along a hot-gas path of a turbine, decrease in such stress-resistance when in such high temperatures.

Layered components having different materials are known to present challenges. Such challenges are greater for materials in direct contact that have different properties. For example, the difference in coefficients of thermal expansion, thermal conductivity, and other properties can cause the interface between these layers to delaminate and/or form undesirable features, thereby limiting the applications of such layered components.

A layered arrangement, a hot-gas path component, and a process of producing a layered arrangement that do not suffer from one or more of the above drawbacks would be desirable in the art.

BRIEF DESCRIPTION OF THE INVENTION

In an exemplary embodiment, a layered arrangement includes a substrate layer, a ceramic matrix composite layer, and a non-metal spacer between the substrate layer and the ceramic matrix composite layer configured to define one or more pockets.

In another exemplary embodiment, a hot-gas-path component of a turbine includes a nickel-based superalloy layer, a ceramic matrix composite layer, and a ceramic spacer between the nickel-based superalloy layer and the ceramic matrix composite layer. The ceramic spacer is mechanically secured to one or both of the substrate layer and the ceramic matrix composite layer, and the ceramic spacer is bonded to the substrate layer or the ceramic matrix composite layer.

In another exemplary embodiment, a process of producing a layered arrangement includes securing a non-metal spacer between a substrate layer and a ceramic matrix composite layer of the layered arrangement.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary layered arrangement, a hot-gas path component, and a process of producing a layered arrangement according to the disclosure. Embodiments of the present disclosure permit use of components in higher temperatures and/or for longer periods of time, permit positive attributes of ceramic matrix composite and metal or metallic substrates to be utilized in a layered component, permit increased turbine efficiency, permit extended use/durability of turbine components (for example, hot-gas path components), permit increased turbine quality, permit higher firing temperatures in turbines, permit a higher temperature gradient between layers of a component, or combinations thereof, for example, in comparison to using layered components having ceramic matrix composite and metal layers in direct contact.

Figure 1:
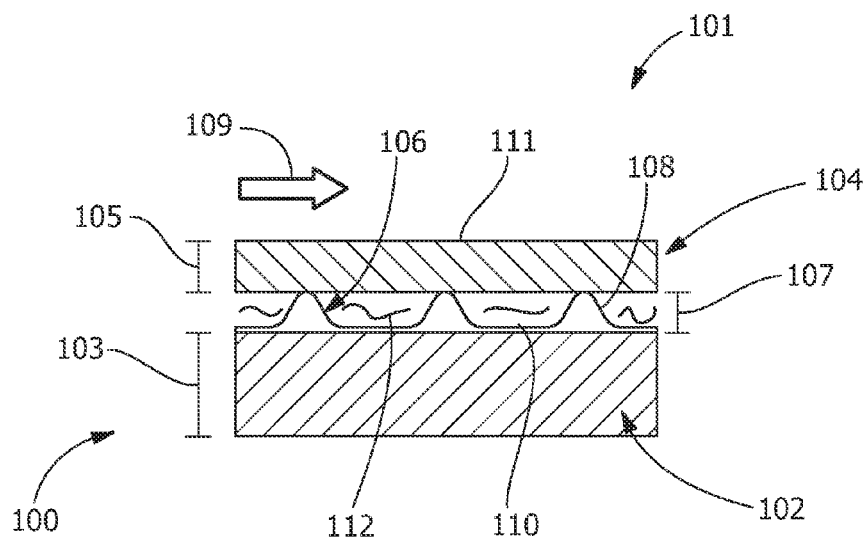
FIG. 1 shows a side view of an exemplary layered arrangement according to an embodiment of the disclosure.
Figure 2:
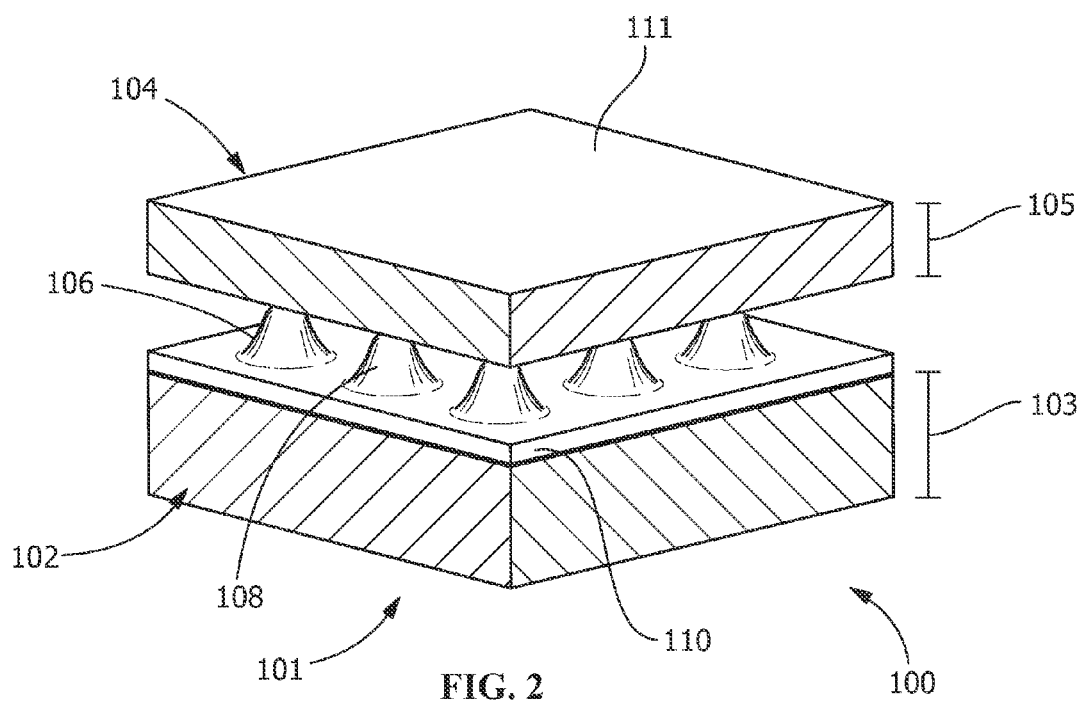
FIG. 2 shows a perspective view of an exemplary layered arrangement according to an embodiment of the disclosure.

FIGS. 1 and 2 show a layered arrangement 100 including a substrate layer 102, a ceramic matrix composite layer 104, and one or more non-metal spacers 106 between the substrate layer 102 and the ceramic matrix composite layer 104. In one embodiment, a portion of a turbine component 101 includes the layered arrangement 100 and defines a surface 111 of the turbine component 101, such as, a hot-gas path 109 (see FIG. 1), a side wall 302 (see FIG. 3) of a turbine nozzle 300 (see FIG. 3), an airfoil surface 402 (see FIG. 4) of an airfoil 400 (see FIG. 4), a turbine shroud 500 (see FIG. 5), or a combination thereof. Additionally or alternatively, the layered arrangement 100 is capable of being used with components subjected to stress, such as, a turbine case.

Referring to FIGS. 1 and 2, the substrate layer 102, the ceramic matrix composite layer 104, and the non-metal spacer(s) 106 include any suitable dimensions based upon desired properties. For example, a suitable substrate thickness 103 for the substrate layer 102 is at least about 10 mils, at least about 15 mils, at least about 20 mils, between about 10 mils and about 30 mils, between about 15 mils and about 25 mils, between about 10 mils and about 20 mils, between about 20 mils and about 30 mils, about 20 mils, or any suitable combination, sub-combination, range, or sub-range therein. A suitable ceramic matrix composite thickness 105 for the ceramic matrix composite layer 104 is at least about 20 mils, at least about 30 mils, at least about 40 mils, between about 30 mils and about 50 mils, between about 30 mils and about 40 mils, between about 40 mils and about 50 mils, between about 35 mils and about 45 mils, about 40 mils, or any suitable combination, sub-combination, range, or sub-range therein. As is described with more detail below, the dimensions of the non-metal spacer(s) 106 are dependent upon the geometry of the non-metal spacer(s) 106.

The substrate layer 102 is any suitable material. Suitable materials include, but are not limited to, nickel-based alloys and superalloys, chromium-based alloys and superalloys, cobalt-based alloys and superalloys, iron-based alloys and superalloys, or combinations thereof. In one embodiment, the substrate layer 102 has stress-resistant properties exceeding that of the ceramic matrix composite layer 104 and/or other similar ceramic matrix composite materials.

The ceramic matrix composite layer 104 is any suitable material providing properties for the desired application, such as temperature-resistances along the hot-gas path 109, where temperatures of turbine components exceed about 1,000° C. Suitable materials for the ceramic matrix composite layer 104 include, but are not limited to, carbon, silicon carbide (SiC), silicon nitride ($Si_3N_4$), alumina ($Al_2O_3$), mullite ($Al_2O_3$—$SiO_4$), or a combination thereof. Fiber reinforcement of the ceramic matrix composite layer 104 is with carbon, silicon carbide (SiC), silicon nitride ($Si_3N_4$), alumina ($Al_2O_3$), mullite ($Al_2O_3$—$SiO_4$), or a combination thereof.

Figure 6:
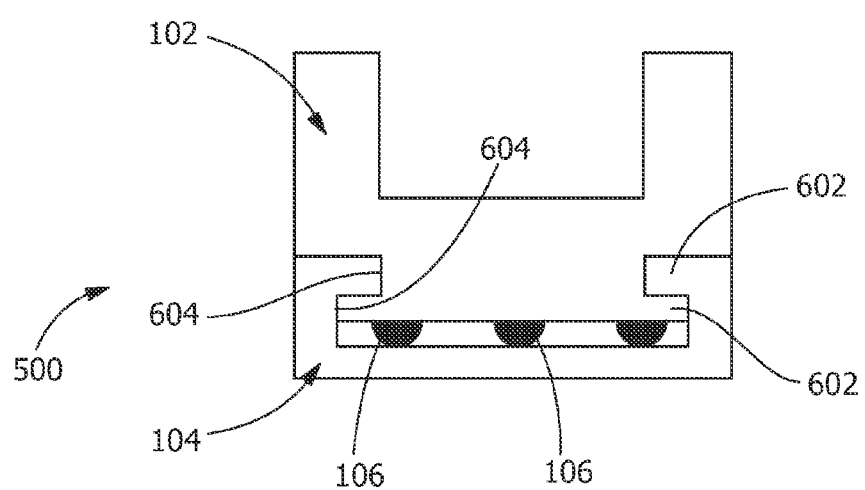
FIG. 6. shows a sectioned view along line A-A of the exemplary turbine shroud shown in FIG. 5.

The non-metal spacer 106 separates any suitable portion or all of the ceramic matrix composite layer 104 from the substrate layer 102. In one embodiment, the non-metal spacer 106 is mechanically secured to one or both of the substrate layer 102 and the ceramic matrix composite layer 104, for example, as is shown in FIG. 6, by interlocking of a protruding feature 602 (on the ceramic matrix composite layer 104 and/or the substrate layer 102) and a groove 604 (on the ceramic matrix composite layer 104 and/or the substrate layer 102). Additionally or alternatively, the non-metal spacer 106 is bonded to the substrate layer 102 or the ceramic matrix composite layer 104.

Figure 3:
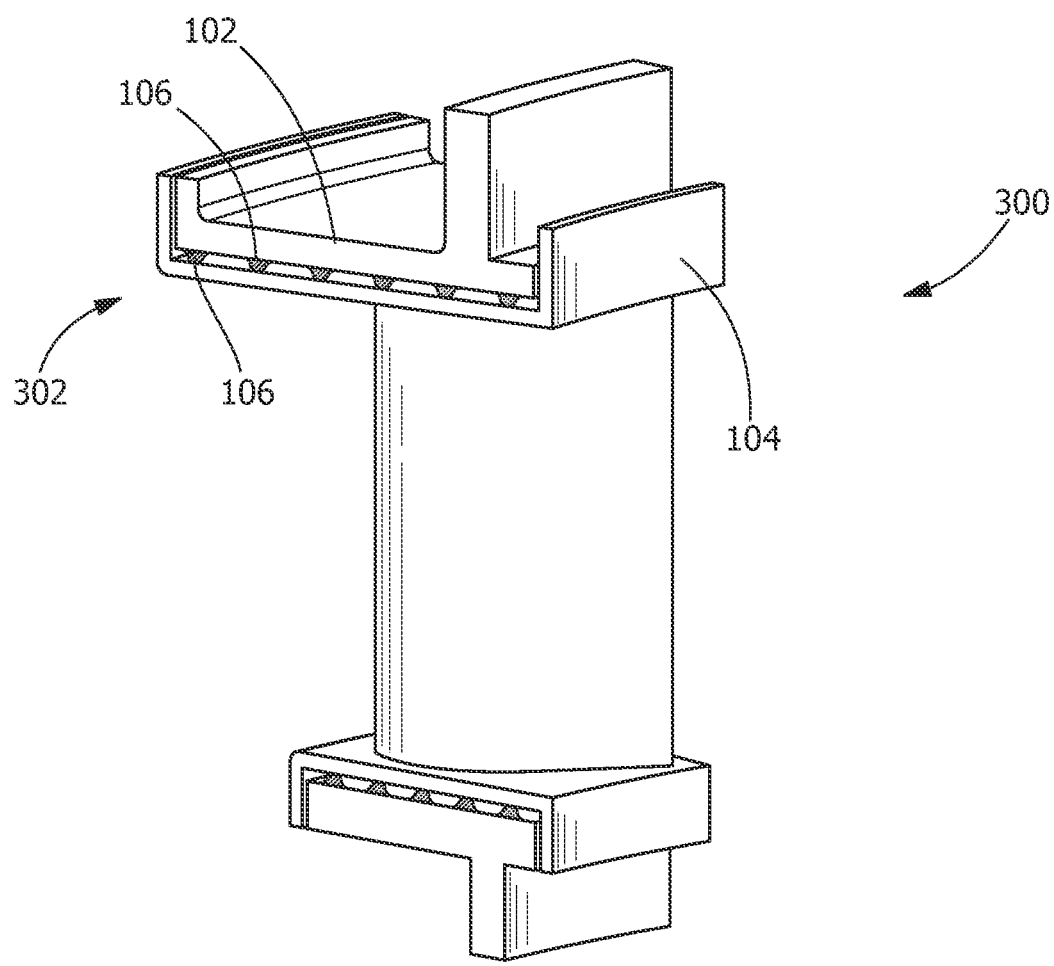
FIG. 3 shows a perspective view of an exemplary turbine nozzle having layered side walls according to an embodiment of the disclosure.
Figure 4:
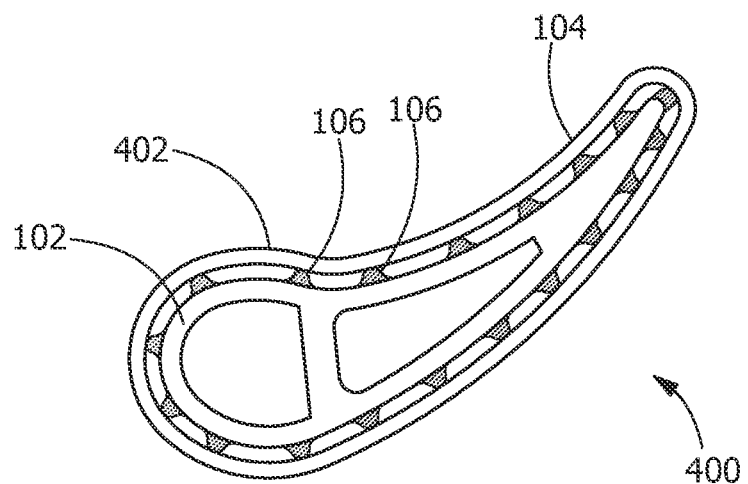
FIG. 4 shows a sectioned view of an exemplary airfoil having a layered surface according to an embodiment of the disclosure.
Figure 5:
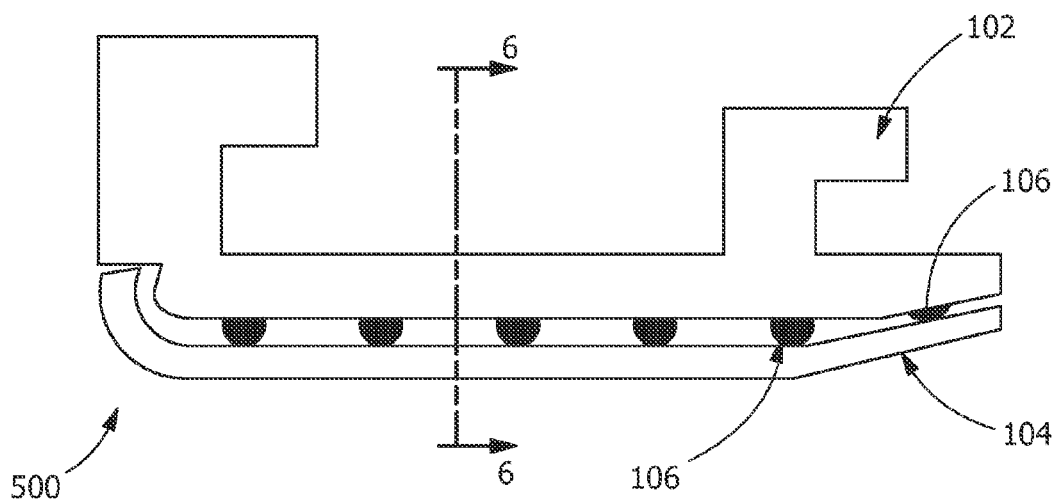
FIG. 5 shows a side view of an exemplary turbine shroud having a layered arrangement according to an embodiment of the disclosure.
Figure 7:
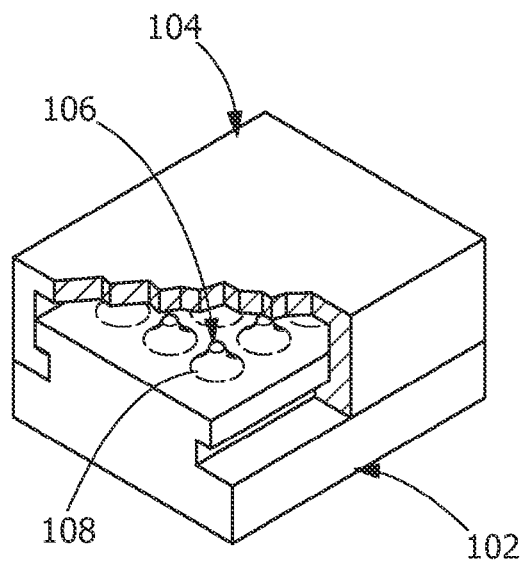
FIG. 7. shows a cutaway perspective view of an exemplary turbine shroud having a layered arrangement according to an embodiment of the disclosure.

The dimensions and geometry of the non-metal spacer 106 depend upon the configuration of the substrate layer 102 and the ceramic matrix composite layer 104. As is shown in FIG. 5, in one embodiment, a plurality of the non-metal spacers 106 have inconsistent dimensions based upon the positioning. In other embodiments, as is shown in FIG. 3, the non-metal spacers 106 have substantially uniform dimensions. Additionally or alternatively, in some embodiments, the non-metal spacers 106 are arranged as individual spacer bodies 108 extending from a spacer coating 110 as is shown in FIG. 2, extending from the substrate layer 102 as is shown in FIG. 7, and/or extending from the ceramic matrix composite layer 104.

Figure 8:
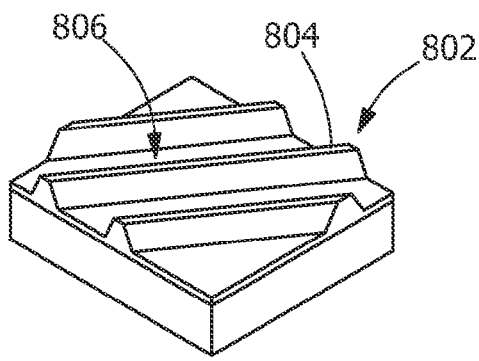
FIG. 8 shows a perspective view of an exemplary non-metal spacer having a plurality of ridges according to the disclosure.
Figure 9:
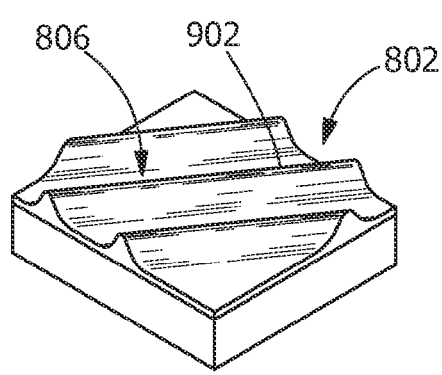
FIG. 9 shows a perspective view of an exemplary non-metal spacer having a plurality of ridges according to the disclosure.
Figure 10:
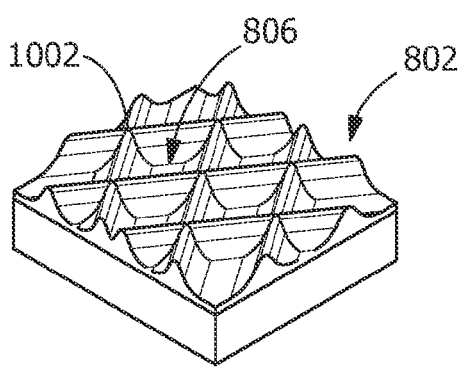
FIG. 10 shows a perspective view of an exemplary non-metal spacer having a plurality of intersecting ridges according to the disclosure.

As is shown in FIGS. 8-10, in some embodiments, the non-metal spacers 106 are arranged as one or more ridges 802 extending along the arrangement 100 (see FIG. 1). The ridges 802 include a plateau 804 (see FIG. 8), a peak 902 (see FIG. 9), intersecting ridges 1002 (see FIG. 10), or a combination thereof. As is shown in FIG. 1, in one embodiment, a spacer thickness 107 (a thickness of the spacer bodies 108 and the spacer coating 110, if present) is at least about 35 mils, at least about 40 mils, at least about 45 mils, between about 35 mils and about 55 mils, between about 35 mils and about 45 mils, between about 45 mils and about 55 mils, between about 40 mils and about 50 mils, about 45 mils, or any suitable combination, sub-combination, range, or sub-range therein.

Referring again to FIGS. 8-10, in one embodiment, the non-metal spacer 106 defines pockets 806. The pockets 806 are capable of containing a substance 112 (see FIG. 1), such as air and/or any other suitable substance capable of greater thermal insulation than the substrate layer 102 and/or the ceramic matrix composite layer 104. Suitable substances include, but are not limited to, stagnant air, flowing air, fibers, fuel, cooling fluid (stagnant and/or flowing), liquid, gel, steam, or combinations thereof. In one embodiment, the non-metal spacers 106 and the pockets 806 are completely enclosed by the substrate layer 102 and the ceramic matrix composite layer 104, thereby preventing flow into the pockets 806. Alternatively, the non-metal spacers 106 and the pockets 806 are not completely enclosed, thereby permitting flow, into and out of one or more of the pockets 806.

The non-metal spacer 106 is any suitable material(s) capable of reducing heat transfer between the ceramic matrix composite layer 104 and the substrate layer 102 and capable of reducing the impact of stress from the substrate layer 102 on the ceramic matrix composite layer 104. Suitable materials for the non-metal spacer 106 include, but are not limited to, ceramics, yttria-stabilized zirconia, gadolinium zirconate, rare earth zirconates, thermal barrier coatings, or combinations thereof. For example, suitable materials have a thermal conductivity that is at least a predetermined amount less than the substrate layer 102, such as, being between about one-tenth and about one-third of the thermal conductivity of the substrate layer 102, being between about one-third and about one-half of the thermal conductivity of the substrate layer 102, being between about one one-quarter and about one-half of the thermal conductivity of the substrate layer 102, being between about one-quarter and about one-third of the thermal conductivity of the substrate layer 102, being between about one-tenth and about one-third of the thermal conductivity of the substrate layer 102, being about one-half, about one-quarter, about one-third, about one-tenth, or any suitable combination, sub-combination, range, or sub-range thereof.

The non-metal spacer 106, the individual spacer bodies 108, the spacer coating 110, or a combination thereof are grown and/or applied to the substrate layer 102 and/or the ceramic matrix composite layer 104. In one embodiment, such application is by electron beam physical vapor deposition (EBPVD), air plasma spray (APS), high velocity oxygen fuel (HVOF), electrostatic spray assisted vapor deposition (ESAVD), direct vapor deposition, other suitable spray techniques, or a combination thereof. In a further embodiment, the non-metal spacer 106 is positioned after machining of the substrate layer 102 and/or after forming/rigidizing of the ceramic matrix composite layer 104, thereby complementing geometric features of the substrate layer 102 and/or the ceramic matrix composite layer 104. For example, in this embodiment, the pockets 806 within the non-metal spacers 106 are at least partially defined by non-planar features of the substrate layer 102 and/or the ceramic matrix composite layer 104. In another embodiment, the non-metal spacer 106 is applied after stripping of an existing layer, such as the non-metal spacer 106 after extended use, the substrate layer 102, the ceramic matrix composite layer 104, or a combination thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hot gas path component, the hot gas path component comprising a layered arrangement, the layered arrangement including:
    a substrate layer;
    a ceramic matrix composite layer; and
    a non-metal spacer between the substrate layer and the ceramic matrix composite layer configured to define a plurality of pockets, the non-metal spacer having a composition distinct from each of the substrate layer and the ceramic matrix composite layer,
    wherein the plurality of pockets contain a substance including a property of greater thermal insulation than the substrate layer,
    wherein the substrate layer, the ceramic matrix composite layer and the non-metal spacer form a plurality of completely enclosed pockets, preventing flow into each of the plurality of completely enclosed pockets; and
    wherein the hot gas path component is a component along a hot gas path of a turbine.

2. The hot gas path component of claim 1, wherein the substrate layer is a nickel-based superalloy.

3. The hot gas path component of claim 1, wherein the composition of the non-metal spacer includes a ceramic.

4. The hot gas path component of claim 1, wherein the composition of the non-metal spacer includes a thermal barrier coating material.

5. The hot gas path component of claim 1, wherein the non-metal spacer is formed from a yttria-stabilized zirconia.

6. The hot gas path component of claim 1, wherein the substance includes air, the substance being trapped in the plurality of pockets within the layered arrangement.

7. The hot gas path component of claim 1, wherein the layered arrangement is a side wall of a turbine nozzle.

8. The hot gas path component of claim 1, wherein the layered arrangement is an airfoil surface.

9. The hot gas path component of claim 1, wherein the layered arrangement is a turbine shroud.

10. The hot gas path component of claim 1, wherein the non-metal spacer includes a ridge extending along the layered arrangement.

11. The hot gas path component of claim 1, wherein the non-metal spacer includes intersecting ridges.

12. The hot gas path component of claim 1, wherein the substance includes a thermally insulating substance.

13. The hot gas path component of claim 1, wherein the non-metal spacer is mechanically secured to one or both of the substrate layer and the ceramic matrix composite layer.

14. The hot gas path component of claim 1, wherein the non-metal spacer is bonded to the substrate layer or the ceramic matrix composite layer.

15. The hot gas path component of claim 1, wherein the non-metal spacer has a thermal conductivity that is less than one-third of the thermal conductivity of the substrate layer.

16. The hot gas path component of claim 1, wherein the substrate layer is at least 10 mils thick, the ceramic matrix composite layer is at least 20 mils thick, and the non-metal spacer includes a maximum thickness dimension of at least 30 mils.

17. A hot path component, comprising:
    a nickel-based superalloy layer;
    a ceramic matrix composite layer; and
    a ceramic spacer between the nickel-based superalloy layer and the ceramic matrix composite layer configured to define a plurality of pockets, the ceramic spacer having a composition distinct from the ceramic matrix composite layer,
    wherein the ceramic spacer is mechanically secured to one or both of the nickel-based superalloy layer and the ceramic matrix composite layer,
    wherein the ceramic spacer is bonded to the nickel-based superalloy layer or the ceramic matrix composite layer,
    wherein the plurality of pockets contain a substance including a property of greater thermal insulation than the nickel-based superalloy layer,
    wherein the nickel-based superalloy layer, the ceramic matrix composite layer and the ceramic spacer form a plurality of completely enclosed pockets, preventing flow into each of the plurality of completely enclosed pockets; and
    wherein the hot gas path component is a component along a hot gas path of a turbine.

18. A process for producing a hot gas path component of a including a layered arrangement, the process comprising securing a non-metal spacer between a substrate layer and a ceramic matrix composite layer of the layered arrangement, and incorporating the layered arrangement into the hot gas path component, wherein:
    the non-metal spacer is configured to define a plurality of pockets;
    the plurality of pockets contain a substance including a property of greater thermal insulation than the substrate layer;
    the non-metal spacer includes a composition distinct from each of the substrate layer and the ceramic matrix composite layer;
    the substrate layer, the ceramic matrix composite layer and the non-metal spacer form a plurality of completely enclosed pockets, preventing flow into each of the plurality of completely enclosed pockets; and
    the hot gas path component is a component along a hot gas path of a turbine.

* * * * *